(12) United States Patent
Doyen

(10) Patent No.: US 10,047,866 B2
(45) Date of Patent: Aug. 14, 2018

(54) DEVICE FOR AND METHOD OF INSTALLATION OF COMPONENT WITHIN AND REMOVAL FROM A BORE

(71) Applicant: Serge Doyen, Essex, CT (US)

(72) Inventor: Serge Doyen, Essex, CT (US)

(73) Assignee: THE LEE COMPANY, Westbrook, CT (US)

( * ) Notice: Subject to any disclaimer, the term of this patent is extended or adjusted under 35 U.S.C. 154(b) by 576 days.

(21) Appl. No.: 13/815,265

(22) Filed: Feb. 14, 2013

(65) Prior Publication Data

US 2014/0223719 A1    Aug. 14, 2014

(51) Int. Cl.
*B23P 11/00* (2006.01)
*F16K 1/34* (2006.01)
*F16K 27/02* (2006.01)

(52) U.S. Cl.
CPC ............... *F16K 1/34* (2013.01); *F16K 27/02* (2013.01); *F16K 27/0245* (2013.01); *Y10T 29/4994* (2015.01); *Y10T 29/49822* (2015.01)

(58) Field of Classification Search
CPC .......... B23P 11/00; B23P 11/005; B23Q 1/25; B23Q 3/10
USPC .......................................................... 29/280
See application file for complete search history.

(56) References Cited

U.S. PATENT DOCUMENTS

| | | | | |
|---|---|---|---|---|
| 2,152,102 A | * | 3/1939 | Stecher | B21C 37/15 |
| | | | | 285/148.9 |
| 2,621,948 A | * | 12/1952 | Geddes | B21D 1/12 |
| | | | | 403/316 |
| 3,314,542 A | * | 4/1967 | Kudlaty | B01D 29/114 |
| | | | | 210/130 |
| 3,442,537 A | * | 5/1969 | Mack | B21K 1/16 |
| | | | | 285/148.13 |
| 3,570,111 A | * | 3/1971 | Courtot et al. | B21K 1/16 |
| | | | | 29/445 |
| 3,596,934 A | * | 8/1971 | De Cenzo | F16L 27/12 |
| | | | | 285/145.1 |
| 4,150,847 A | * | 4/1979 | De Cenzo | F16L 19/0218 |
| | | | | 285/233 |
| 6,398,038 B1 | * | 6/2002 | Fontes | A01K 63/045 |
| | | | | 210/123 |
| 6,450,550 B1 | * | 9/2002 | Cornwell | F16L 19/0283 |
| | | | | 285/340 |

(Continued)

FOREIGN PATENT DOCUMENTS

DE        102010018619 A1 * 11/2010 ............... B25B 9/00

*Primary Examiner* — Lee D Wilson
(74) *Attorney, Agent, or Firm* — Cantor Colburn LLP

(57) ABSTRACT

A device is formed that will accept or itself be a component to be inserted into and removably secured in a bore, the device being a cup shaped housing with a cylindrical wall and a floor in which there may be a central opening, the open end of the housing has an inner chamfer and an outer chamfer and an outwardly protruding ridge extending around the open end, and the device is used by inserting into a bore, with or without a separate component secured inside the housing, and forcing the ridge to expand into the bore wall by way of a tool having an outer conical surface corresponding to the inner chamfer, after which the housing can be removed by forcing the open end and ridge to compact by way of a tool having an inner conical surface corresponding to the housing outer chamfer.

6 Claims, 13 Drawing Sheets

(56) References Cited

U.S. PATENT DOCUMENTS

| | | | |
|---|---|---|---|
| 2006/0016767 A1* | 1/2006 | Olson | B01D 29/15 210/767 |
| 2008/0106092 A1* | 5/2008 | Klein | F16L 41/02 285/5 |
| 2011/0061856 A1* | 3/2011 | Kellner | E21B 23/02 166/193 |
| 2012/0227837 A1* | 9/2012 | Lee | B60T 17/04 137/511 |
| 2016/0357198 A1* | 12/2016 | Fangmeier | G05D 16/106 |

* cited by examiner

DEVICE FOR AND METHOD OF INSTALLATION OF COMPONENT WITHIN AND REMOVAL FROM A BORE

CROSS REFERENCE TO RELATED PROVISIONAL APPLICATION

This application claims the benefit of U.S. Provisional Application No. 61/663,638, filed Feb. 15, 2012.

BACKGROUND OF THE INVENTION

A. Field of Invention

The present invention relates generally to the installation of an item within a bore and more particularly to a device for and method of installation and removal of a system component within a bore formed in a boss or manifold.

B. Description of Related Art

A variety of systems, particularly fluid systems, require the insertion of components, such as valves, restrictors, screens or filters or the like within a tube, or a bore or passage formed in a boss or manifold under conditions where the ability to readily remove the component is desirable. Conventional installation methods include cementing, welding or screwing the component in place. These methods of securing a component in place within a bore generally involve permanent alteration of either the component or the installation site or both, preventing easy removal or replacement of the component without damage to the component or installation bore. Since components used in such systems may be susceptible to clogging or need periodic replacement, it is desirable to provide an installation system that could be removed without damage to the component or the installation bore.

Therefore, there is a need for an improved device and method for securely and removably securing a component within a bore.

SUMMARY OF THE INVENTION

The present invention uses an installation housing, within which a component, which in a fluid system may include flow control devices, may be secured. While the present invention can be useful in a wide variety of applications, the most commonly anticipated application is within fluid systems. Therefore, for ease of description and not as a limitation, terminology for fluid systems may be used in this description. The housing has a generally cup like shape with a cylindrical and relatively thin walled side and a transverse floor that is adapted with a central opening to allow flow as desired through the fluid system component, which is secured within the housing by attachment to the floor surface. The housing with component secured thereto or the housing by itself comprises a device that can be installed or removed from a bore. The cylindrical sidewall of the installation housing forms an opening with a beveled annular lip at the end axially opposite from the housing floor. The beveled lip is formed with an outer chamfer between the outer surface of the housing sidewall and the lip end of the housing sidewall and an inner chamfer between the inner surface of the housing sidewall and the lip end of the housing sidewall. An automatic center punch is used to deform the housing lip outwardly to secure the device within an installation bore and inwardly to allow removal of the device from the installation bore. For installation, a conical tip is used on the center punch to forcefully engage the inner chamfer of the housing lip and deform the lip outwardly, and for removal, a tip with a reverse conical surface is used with the center punch to forcefully engage the outer chamfer of the housing lip to deform the lip inwardly. An annular groove is cut into the outer surface of the housing sidewall proximate to the housing lip to allow the housing sidewall to flex during installation and removal.

The method of the present invention comprises the construction of the installation housing as described above and the secure placement of a system component within the installation housing, the formation of an outwardly facing shoulder, insertion of the housing within the installation bore until the floor of the housing engages the bore shoulder, and the use of an automatic center punch with conical tip to outwardly deform the housing lip to engage the wall of the installation bore. The method may further include the removal of the device by use of an automatic center punch with an inverse conical tip to inwardly deform the housing lip to disengage from the wall of the installation bore.

The principle aim of the present invention is to provide a new and improved device and method that meets the foregoing requirements and is capable of providing an efficient and economical means for the installation and removal of a system component within a bore.

Other objects and advantages of the invention will become apparent from the Description of the Preferred Embodiments and the Drawings and will be in part pointed out in more detail hereinafter.

The invention consists in the features of construction, combination of elements and arrangement of parts exemplified in the construction and method as hereinafter described.

DESCRIPTION OF THE PREFERRED EMBODIMENT(S)

Figure 3:
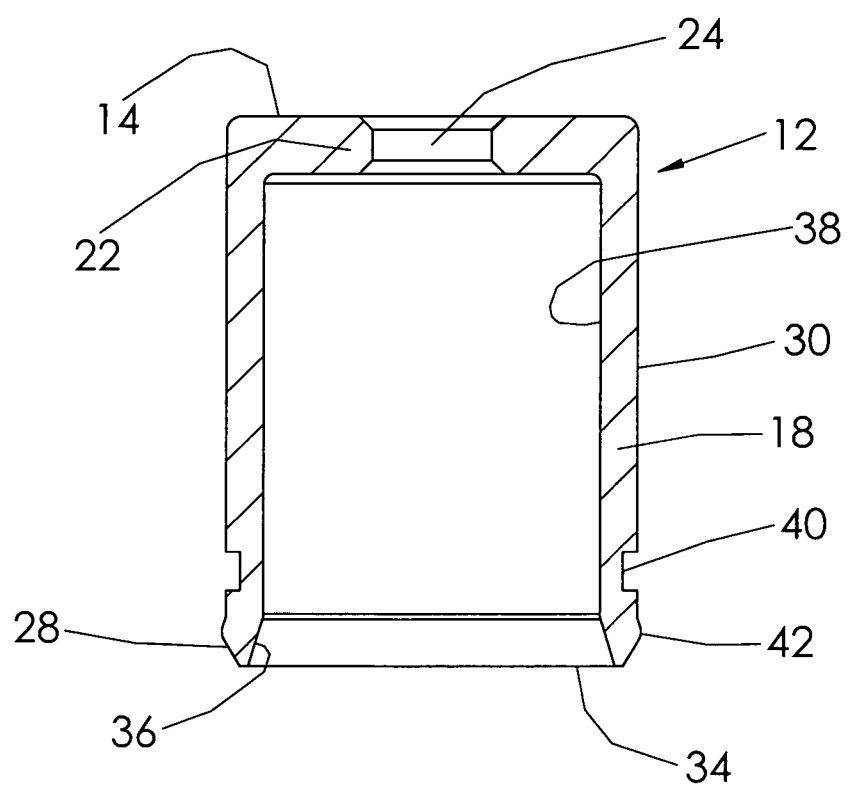
FIG. 3 is cross section view of a device in accord with the present invention
Figure 4:
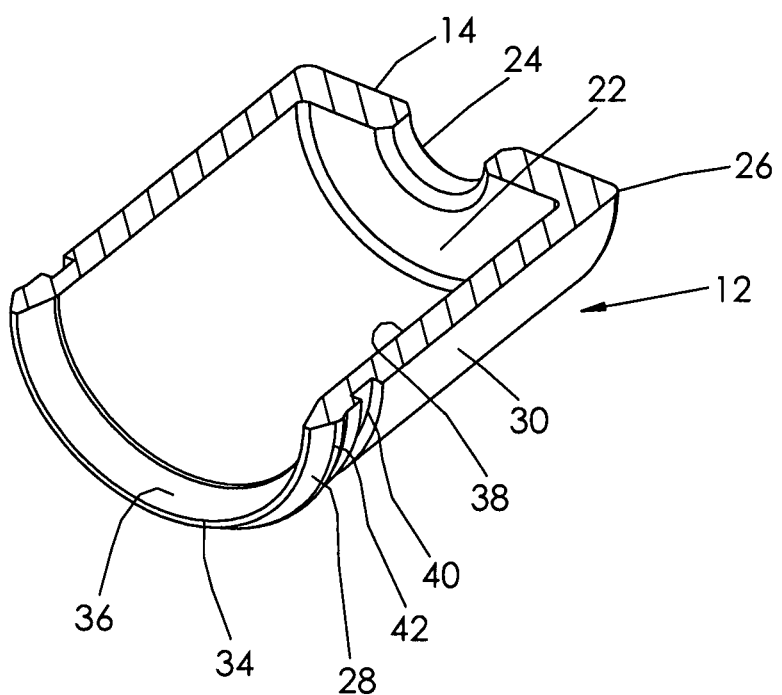
FIG. 4 is a perspective view of a sectioned device in accord with the present invention.
Figure 7:
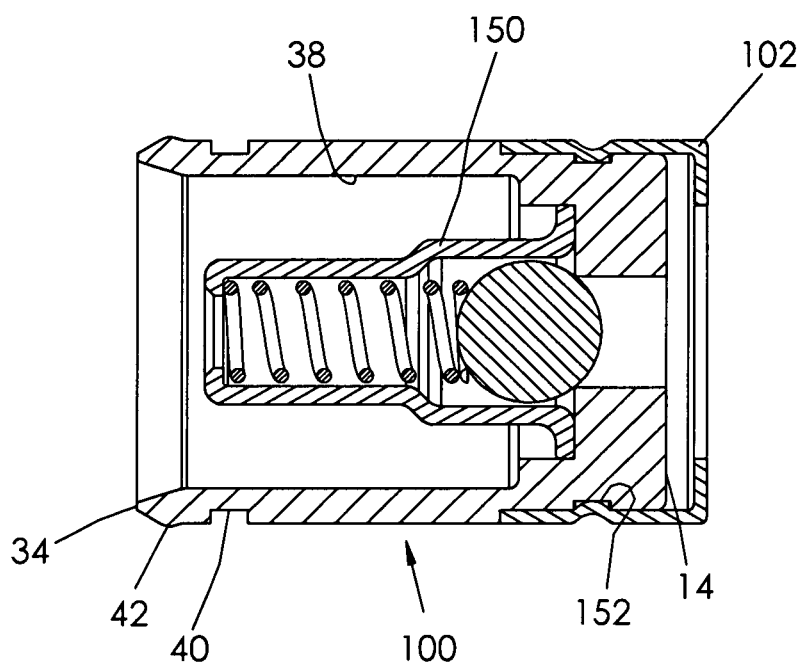
FIG. 7 is a cross section view of a second preferred embodiment of a device in accord with the present invention, with a typical flow control component secured therein.

With reference to the Figures wherein like numerals represent like parts, a preferred embodiment of a device constructed in accordance with and for use in performing the method of the present invention comprises a housing that is generally designated by numeral 12 in FIGS. 1, 2, 3, 4, and 5. Housing 12 is illustrated and described as having an end that is to be inserted first into an installation bore and which is referred to as being at the bottom or floor merely for ease of reference. Relative directions such as upper and lower, or inner or outer can be used in the description, and no limitation of the direction of installation is intended by such reference, except that the upper or outer end of housing 12 must be accessible for installation and removal. For the purpose of illustrating the method of use of housing 12, an example of a typical fluid system component, such as a restrictor, check valve, filter screen or other flow control device, is shown in FIGS. 3 and 7 and designated by the numeral 150. It will be anticipated that the device and method of the present invention can be useful in many different circumstances for removably securing items in a bore, and that the use of flow control devices as exemplars herein is for the purpose of illustration and not limitation of the invention. It will be further anticipated that the housing itself may be configured to serve as a useful system insert, for example, if the housing opening is modified to serve a flow control purpose, such as a flow restrictor, or if the features of the component are integrated into the structure of the housing 12.

Figure 1:
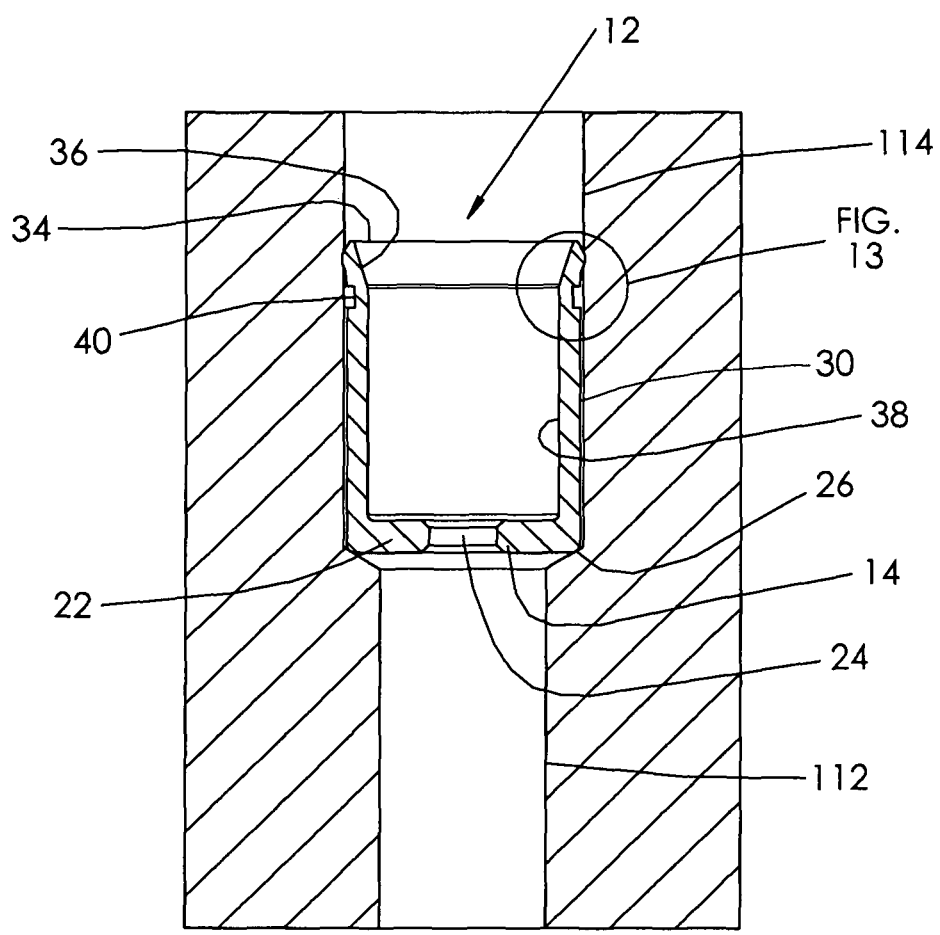
FIG. 1 is a cross section view of a device in accord with the present invention, installed and secured within an installation bore.
Figure 2:
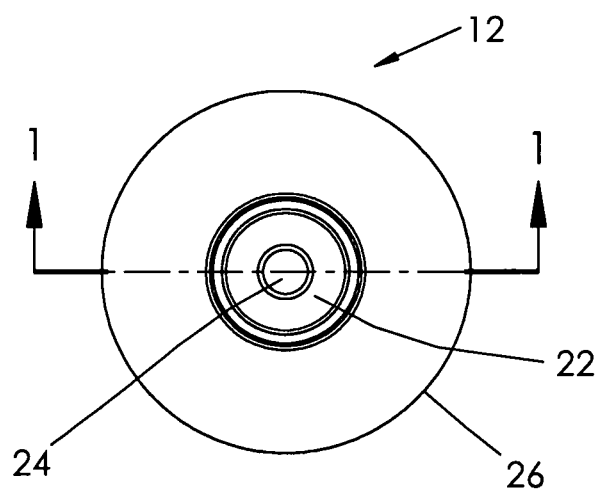
FIG. 2 is an end view of a device in accord with the present invention.
Figure 5:
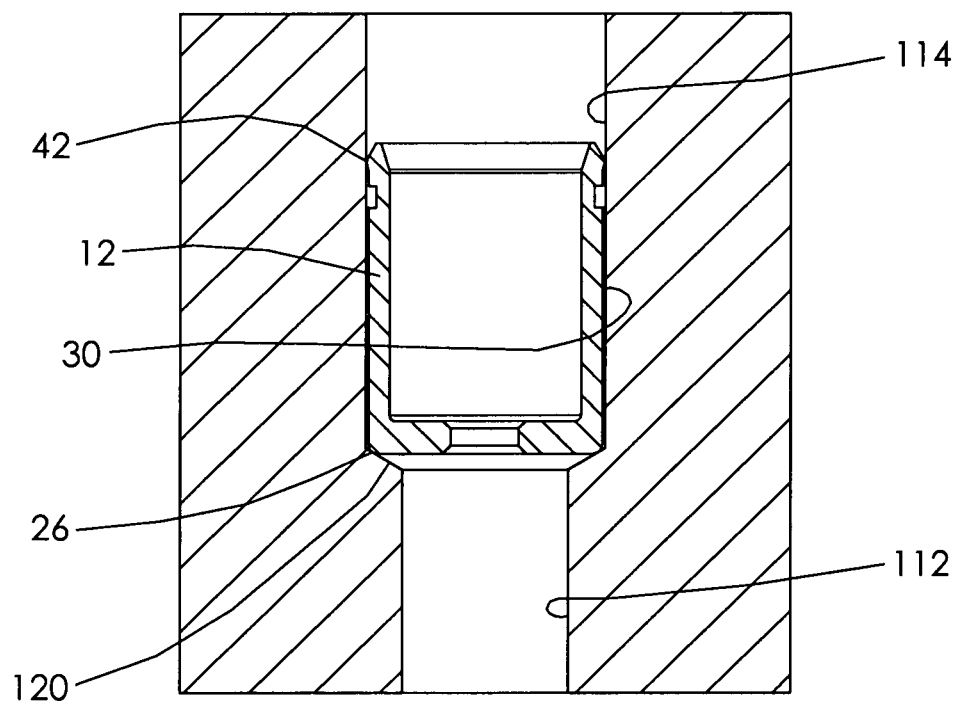
FIG. 5 is an enlarged longitudinal cross section view of a device in accord with the present invention placed but not secured within an installation bore.

Housing 12 is designed to be installed within a section 114 of an installation bore having a inside diameter that is larger than the inside diameter of an inner section 112 of the bore such that the junction of the larger diameter section 114 with a smaller diameter section 112 forms an annular shoulder 120 facing the direction from which housing 12 will be introduced. For ease of reference, shoulder 120 is referred to as facing outwardly. A typical installation bore is illustrated in FIGS. 1 and 5. Housing 12 is generally cup shaped with an exterior appearance including a cylindrical outer surface 30 extending from a floor end 14 to a lip end 34 at the other end. The cylindrical outer surface 30 is formed by a cylindrical sidewall 18, which extends from housing lip end 34 to housing floor end 14. At floor end 14, housing 12 comprises a transverse floor 22 that may be adapted with and is illustrated with a central opening 24 to allow flow as desired to or through component 150. If there is no central opening in the housing floor 22, the housing 12 may be used as a flow preventer or plug. Component 150 is preferably isolated from the housing sidewall 18 by being secured within housing 12 by attachment to the floor 22 surrounding opening 24. The relative dimensions of the housing 12 and the component 150 are preferably selected such that a clearance exists between the component 150 and the interior surface 38 of the sidewall 18, at least in the proximity of housing lip end 34. The general outside diameter of the housing sidewall 18 is selected and/or conversely the inside diameter of the larger bore section 114 is formed, to allow at least a sliding fit of the unexpanded housing 12 within the larger bore section 114 and is greater than the inside diameter of smaller bore section 112. Floor 22 is generally disc shaped and joined to housing sidewall 18 normal to the axis of the cylindrical sidewall 18, forming an annular shoulder 26. At housing lip end 34, a beveled sidewall lip section 16 is formed with an inner chamfer 36 between the inner surface 38 of the housing sidewall 18 and the lip end 34, and a radially outwardly projecting annular ridge 42, and an outer chamfer 28 between ridge 42 and the housing lip end 34. The surface of inner chamfer 36 would lie on a cone that, if extended would have its apex toward floor end 14 and the surface of outer chamfer 28 would lie on a cone that, if extended, would have its apex in the opposite direction away from housing 12. Proximate and parallel to ridge 42, an annular groove 40 is cut into the outer surface 30 of housing sidewall 18 between ridge 42 and shoulder 26. Groove 40 creates a thinner and more flexible portion of the sidewall 18 such that lip section 16 can be expanded or contracted in diameter without materially affecting the diameter of the remainder of sidewall 18. The features of beveled lip section 16, including inner chamfer 36, outer chamfer 28, groove 40 and ridge 42, are symmetrical about the axis of housing sidewall 18 and lie on planes that are normal to said axis, generally parallel to device floor 22. It has been found advantageous when the bore section 114 is formed of cast aluminum and housing 12 is formed of stainless steel to form inner chamfer 36 at approximately 17 degrees from inner sidewall surface 38 and outer chamfer 28 at approximately 30 degrees from the outer sidewall surface 30. Modifications of the bore section 114 material or the material of the housing 12 may allow or require changes to the angles of chamfers 28 and 36 to take advantage of changes in the physical characteristics of different materials.

Figure 6:
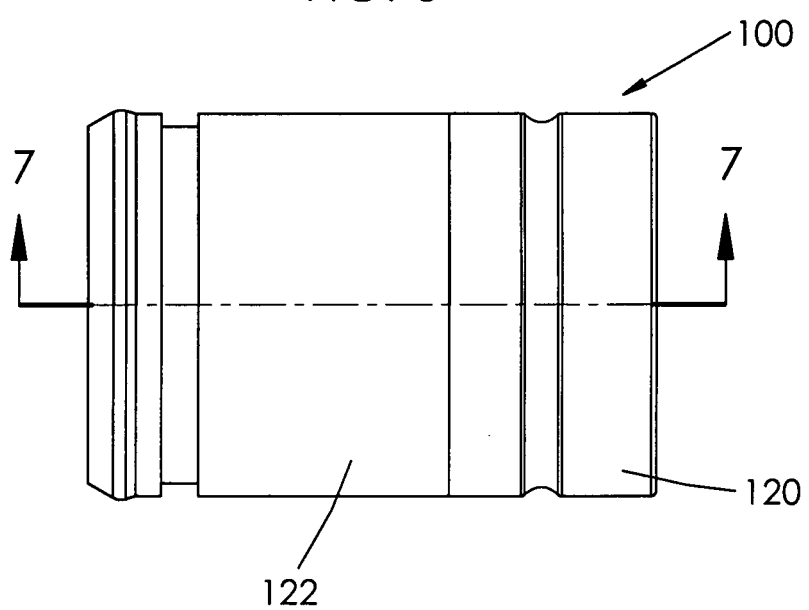
FIG. 6 is a side view of a second preferred embodiment of a device in accord with the present invention.

It will be anticipated that housing 12 may be formed to include additional features as shown in FIGS. 6 and 7, wherein a variation in accord with the present invention is designated by the numeral 100. Housing 100 differs from housing 12 only in the inclusion in housing 100 of an additional section 102 secured to housing 100 and adaptation of the outer surface of housing 100 comprising an inwardly projecting annular groove 152 formed in the inner sidewall surface to accept swaging of section 102 to housing 100. Additional section 102 may be used to include a filter screen or other useful modification to housing 100. It will be further anticipated that additional section 102 or the like may be secured to either housings 12 or 100 by other conventional means, as well, such as by welding, screw threads, or press fitting for example and that additional sections or features not shown could be added to or integrated into housing 12.

Figure 8:
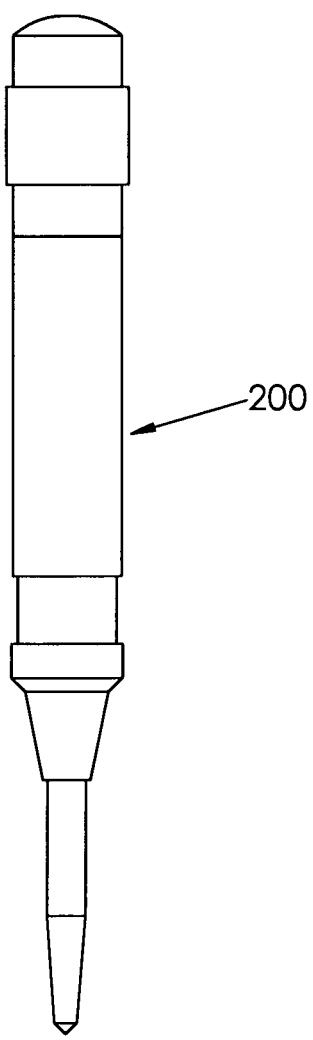
FIG. 8 is a side view of an examplar of a common automatic center punch used in the method of the present invention.
Figure 9:
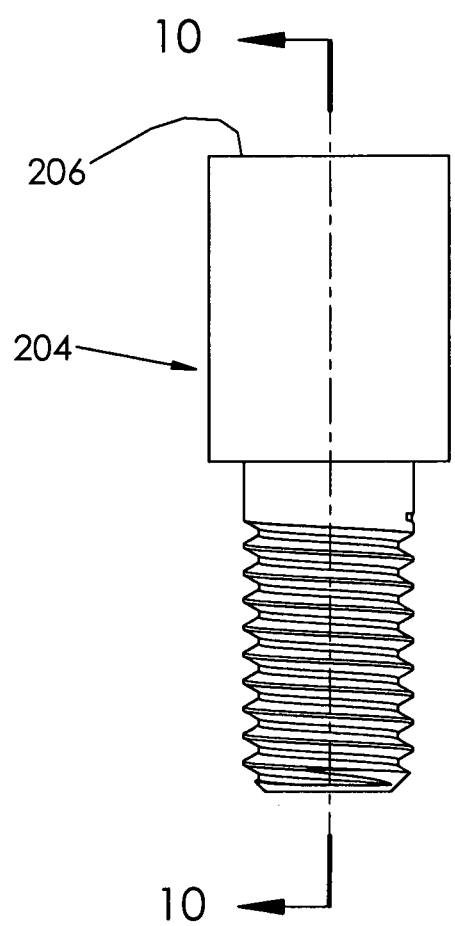
FIG. 9 comprises a side view of a punch tip used in the method of the present invention for removal of the device from a bore.
Figure 10:
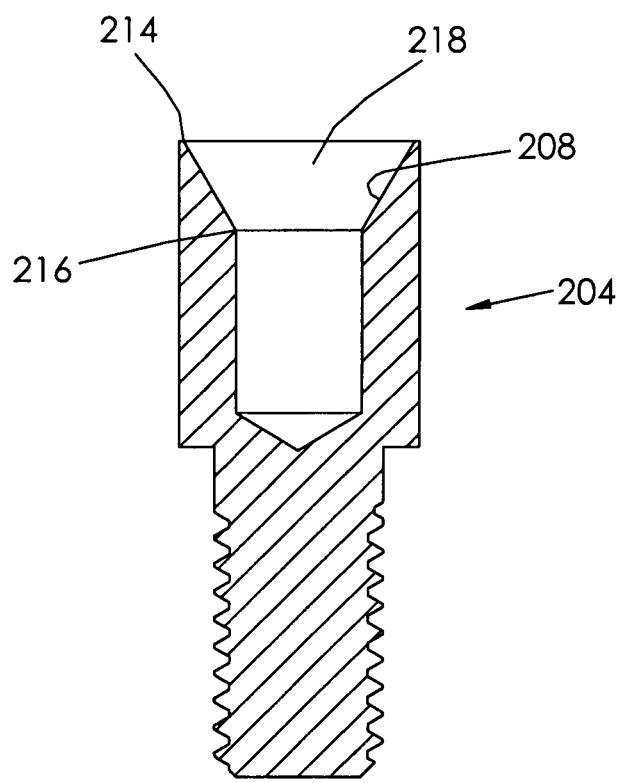
FIG. 10 comprises a longitudinal cross section view of a punch tip used in the method of the present invention for removal of the device from a bore.
Figure 11:
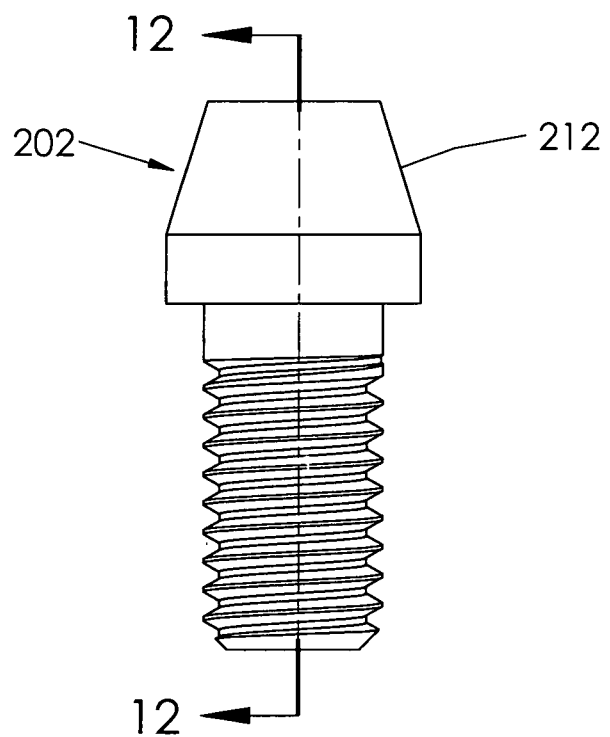
FIG. 11 comprises a side view of a punch tip used in the method of the present invention for installation of the device in a bore.
Figure 12:
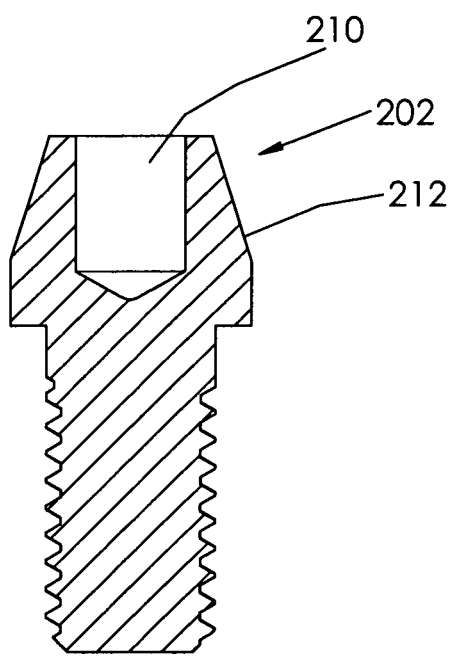
FIG. 12 comprises a longitudinal cross section view of a punch tip used in the method of the present invention for installation of the device in a bore.
Figure 13:
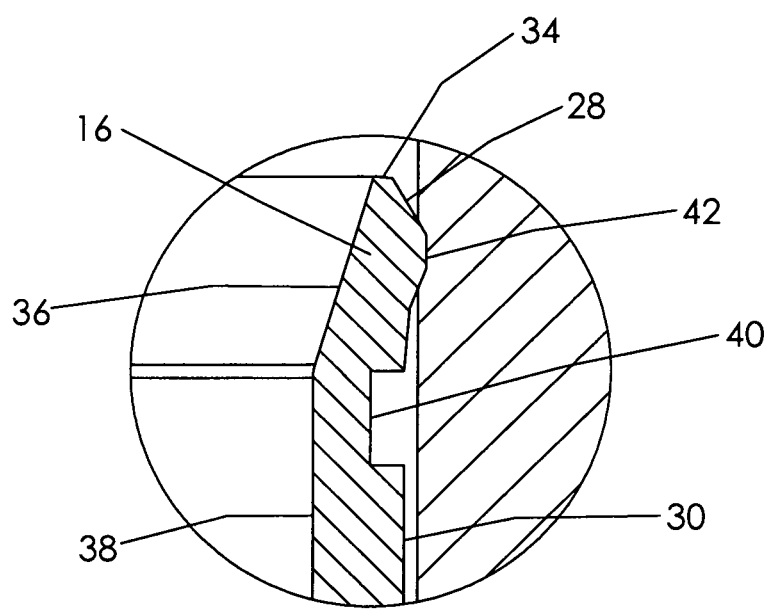
FIG. 13 comprises an enlarged sectional view of a portion of the view from FIG. 1 of a device in accord with the present invention.

Installation of housing 12 or 100 within a bore comprises first forming housing 12 as described above, and then if desired securing a desired component into housing 12 with appropriate alignment of the component with the floor end opening 24, followed by insertion of housing 12 into larger bore section 114 to engage the device shoulder 26 against the bore shoulder 120 to limit travel of the housing 12 farther into the installation bore, and the subsequent radial expansion of lip section 16 to force ridge 42 to securely engage the inside surface of the larger installation bore section 114, thereby securing housing 12 within the installation bore. The expansion of lip section 16 is achieved by means of a common automatic center punch such as punch 200 shown in FIG. 8, fitted with an expansion tip 202 adapted with an open center 210 to avoid impact with a component 150 secured within housing 12. Expansion tip 202 comprises an annular conic outer surface 212 extending from an inner rim that is at least slightly smaller in inside diameter than the inside diameter of the housing inner chamfer 36 to a radially outer rim that is larger in outside diameter than the tool surface inner rim and less than the inside diameter of bore 114. While it will be anticipated that any appropriately sized conically tipped tool could be used to expand lip 16, the automatic punch has the advantage of applying a repeatable predetermined axial force to the tip and thus to the lip section 16. Conical surface 212 is formed at an angle to correspond to inner chamfer 36. The punch 200 is operated such that the conical surface 212 of tip 202 forcefully engages the inner chamfer 36 of the housing 12 to radially deform lip section 16 outwardly to force ridge 42 into forceful engagement with the installation bore.

The method of removing housing with attached component 150 comprises affixing a removal tip 204 to a center punch 200. A removal tip 204 is generally cylindrical having an open center 218 and a leading end 206 with an outer rim 214 and an inner rim 216 and an inner reverse conical surface 208 between rims 214 and 216. Surface 208 is formed at an angle to correspond to outer chamfer 28 on housing 12 and therefore is radially widest at the outer rim 214 of leading end 206 and less radial dimension in the inner rim 216 such that the conical shape suggested by the reverse conical surface 208 would, if extended, have its apex on or near the axis of tip 204 within the interior of the open center 218. The removal method further comprises engaging the removal tip 204 against the outer chamfer 28 of housing 12 and operating to forcefully engage the outer chamfer 28 of the housing 12 to radially deform lip section 16 inwardly to release ridge 42 from engagement with the installation bore. Any conventional means may then be used to remove housing 12 from the installation bore without damage to the component 150 or the bore. After maintenance, inspection and/or replacement of component 150, the housing 12 may be re-installed by the installation method described above.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and the scope of the present invention. It will be anticipated that the size and shape of housing 12 may be altered without departing from the present invention and that a variety of means may be used to secure the component within the device housing 12.

I claim:

1. A device for removably securing a component within a bore, the bore having a portion of wall of a first internal diameter and an adjacent portion of cylindrical wall of a second, greater internal diameter forming a shoulder, the device comprising a housing with a generally cylindrical wall with an open first axial end and a partially closed second axial end comprising an annular shoulder, and an annular lip section at the first end of the cylindrical housing wall, the lip section comprising a radially outwardly projecting and circumferentially extending annular ridge, an inner chamfer creating a frustoconical surface with a base toward the housing first axial end and an outer chamfer creating a frustoconical surface with a base toward the housing first axial end, the housing wall forming an interior space with an inside diameter sufficient to receive the component and an outside diameter that is less than the second, greater internal diameter of the bore portion having an increased internal diameter and greater than the first internal diameter of the bore, the annular ridge having an outside diameter greater than the device wall and slightly less than the second, greater internal diameter of the bore portion having an increased internal diameter.

2. The device of claim 1, wherein the cylindrical wall of the device has a thickness and the thickness of the cylindrical wall is reduced by an annular, circumferentially extending groove in the radially outer surface of the housing wall and axially located proximate to the lip section and toward the housing second end from the annular ridge.

3. The device of claim 2, wherein the device housing is formed of a single piece, and the housing second end is partially closed by a transverse disc shaped floor across the second end of the housing, the floor forming the housing shoulder, facing in a second direction, opposing and engageable with the bore shoulder.

4. The device of claim 3, wherein the floor comprises a central opening.

5. The device of claim 4, wherein the component is secured within the housing.

6. The device of claim 2, wherein the housing second end is closed by the floor.

* * * * *